United States Patent [19]

Stewart et al.

[11] Patent Number: 4,697,079

[45] Date of Patent: Sep. 29, 1987

[54] ANALYZING FLUID FLOWS WITHIN HOLLOW BODIES

[75] Inventors: Peter A. E. Stewart, Bristol; Michael R. Hawkesworth, Birmingham; Roger C. Witcomb, Cheltenham, all of England

[73] Assignee: Rolls-Royce plc, London, United Kingdom

[21] Appl. No.: 714,868

[22] Filed: Mar. 22, 1985

Related U.S. Application Data

[63] Continuation-in-part of Ser. No. 318,939, Nov. 6, 1981.

[30] Foreign Application Priority Data

Mar. 23, 1984 [GB] United Kingdom ............... 8407655

[51] Int. Cl.[4] ............................................. G21H 5/02
[52] U.S. Cl. .................................. 250/303; 250/356.2
[58] Field of Search ............................ 250/303, 356.2

[56] References Cited

U.S. PATENT DOCUMENTS 4,338,520  7/1982  Stewart .............................. 250/356

FOREIGN PATENT DOCUMENTS 2456958  12/1980  France .
2031142   4/1980  United Kingdom .
2087685   5/1982  United Kingdom .

OTHER PUBLICATIONS

"Precise Tracer Measurements of Liquid and Gas Flow", by Colin G. Clayton, *NUCLEON*, Jul. 1960, pp. 96-100.

"Three-Dimensional Reconstruction of Lung Perfusion Image with Positron Detection", by Chesler et al, *Journal of Nuclear Medicine*, vol. 16, No. 1, Jan. 1975, pp. 80-82.

"Microprocessor-Based Flow Measurement Using a Positron Active Tracer", by H. Heusala and R. Myllyla, (1979), vol. 28, No. 4, pp. 321-324. *IEEE Transactions on Instrumentation*, etc.

"Corrections for Attenuation, Scattered Radiation, and Random Coincidences In a Ring Detector Positron Emission Transaxial Tomograph", by M. Bergstrom et al, *IBEE Transactions on Nuclear Science*, vol. NS-27, No. 1 Feb. 1980, pp. 549-554.

"Positron-Emission Tomography", by Ter-Pogossian, et al., *Scientific America*, vol. 243, No. 4 (Oct. 1980), pp. 140, 141, 150, 151.

"The Cern Proportional Chamber Positron Camera", by A. Jeavons, *European Organization For Nuclear Research*, Cern-EP/79-59, Jun. 15, 1979.

"ECAT: A New Computerized Tomographic Imaging System for Positron-Emitting Radiopharmaceuticals", by Michael E. Phelps, *Journal of Nuclear Medicine* 19, 1978, pp. 635-647.

"The Measurement of Flow of Liquids and Gases Using Radioactive Isotopes", by C. G. Clayton, *Journal of British Nuclear Energy Society*, 1964, pp. 252-268.

"The Development of the Rutherford Laboratory MWPC Positron Camera", by J. E. Bateman, et al., Rutherford and Appleton Laboratories, 1980.

"Pulsed Neutron Measurement of Single and Two-Phase Liquid Flow", by P. Kehler, *IEEE Trans on Nucl. Science*, vol. 26, No. 1, Feb. 1979, pp. 1627-1631.

*Primary Examiner*—Bruce C. Anderson
*Assistant Examiner*—Jack I. Berman
*Attorney, Agent, or Firm*—Parkhurst & Oliff

[57] ABSTRACT

Carrier particles, e.g., of metal or metal oxide, are doped with a positron-emitting isotope and injected into fluid flowing in a body, such as a gas turbine engine. The positrons decay on coming to rest, giving two gamma rays which are detected, and a 3D image is built up. The particles are capable of stopping a portion of the positions before they escape from the particles into the surroundings; thus the gamma rays indicate more accurately the position at which the positron was emitted, and give a clearer image.

12 Claims, 3 Drawing Figures

ANALYZING FLUID FLOWS WITHIN HOLLOW BODIES

This is a continuation-in-part of application Ser. No. 318,939, filed on Nov. 6, 1981.

BACKGROUND OF THE INVENTION

1. Field of the Invention

This invention relates to the analysis of fluid flows inside hollow bodies such as, for example, engines, test rigs and pipes, and other bodies in which fluids may flow such as river estuary models. The invention may be used to investigate liquid, gaseous or two phase fluid flows.

2. Description of the Related Art

The use of X-Y position sensitive, or two-dimensional (2D) radiation "cameras" to trace the distribution of radioisotope-labelled liquids introduced into the human body is now a well-established aid to diagnosis of certain medical conditions. One such technique involves the use of a positron-emitting isotope. Each emitted positron travels a certain distance before coming to rest (i.e. to thermal equilibrium with the surroundings). It then annihilates with an electron and produces two 511 keV photons which are emitted in almost exactly opposite directions. Tomography is possible, using a 2D detector on each side of the subject and a small computer to receive, construct, and display the image. The desired radiation is discriminated from background by the acceptance of only the coincident events in the detectors produced by the two photons emitted in almost exactly opposite directions.

With the positron emission tomography (PET) technique the displayed image is computed from the recorded information for a selected plane in the subject. Only events due to decays in this plane appear in focus and, such as is the power of the technique, decays in other planes appear as a more or less uniform background. Moreover, as any of the planes between the detectors may be selected, this technique inherently yields three-dimensional information about its subject.

Our patent specification No. GB 2087685 (corresponding to U.S. application Ser. No. 318,939 filed Nov. 6, 1981) describes a method and apparatus enabling similar studies in engineering applications, such as studying fluid flow in gas turbine engines, where the requirements are much more rigorous. According to that specification, a method of producing a representation of a fluid flow inside a hollow body comprises the following steps:

injecting into the fluid a quantity of a radioactive isotope label which is compatible with the fluid, detecting radiation emitted due to the radioactive decay of the isotope by detection apparatus located outside the body and which produces output signals responsive to the detected radiation, generating a representation of the spatial distribution of the structure of the body which surrounds the fluid flow and of the material from which it is made, producing from said representation attenuation signals representative of the attenuation of the radiation passing through the body, adjusting the output signals from the detection apparatus in dependence upon the attenuation signals to compensate for the attenuation of the radiation and providing adjusted output signals, and, producing from said adjusted output signals a representation of the fluid flow inside the body.

The radioactive isotope label is injected into the fluid in the system under study in a compatible carrier fluid, generally a liquid. In the preferred embodiment, decay of the isotope produces positrons, which when near rest combine with electrons in the fluid. Each positron thus annihilated, produces gamma rays (photons) which can be detected.

Patent Specification No. GB 2031142 A describes a medical use of positron emission tomography, in which very small ($6\mu$–$8\mu$) solid carrier particles are labelled with a positron-emitting isotope and injected into a patient's bloodstream. The particles are tracked in three dimensions. As with all the above noted prior work, however, the positrons travel some distance in the surrounding tissue before coming to rest and emitting two gamma rays. Particularly if the fluid under study is gaseous, the mean free path of a positron before it nears thermal equilibrium with the gas, combines with an electron and is annihilated may be relatively long. Since the gamma rays which are detected indicate the position at which annihilation takes place, rather than the position at which the corresponding isotope atom decayed, this results in a reduction in clarity. The tomograph produced is based not on the true position at which the positron was produced, but on the position at which the positron annihilated. The resulting image has a degree of "fuzziness" corresponding to the distances and random directions travelled by the various positrons whose annihilation is detected. In some cases, especially if the fluid is gaseous, the positrons may tend to reach the walls of the hollow body containing the fluid before annihilation, so that the resulting representation merely shows up the walls. This can still be useful in very narrow passages, to indicate if gas is flowing, but means that the technique cannot show gas flows in larger hollow bodies. Such problems (of a relatively long positron path before annihilation) can also be particularly acute if one wishes to study the flow of a fine liquid jet into a gaseous atmosphere.

SUMMARY OF THE INVENTION

The present invention provides a method of producing a representation of a fluid flow, comprising:

injecting into the fluid a quantity of particles capable of following the flow, the particles being labelled with a positron-emitting isotope, each particle being capable of bringing at least a portion of the positrons emitted within said particle to rest before they escape therefrom, whereby gamma rays are emitted from the particles;

detecting said gamma rays emitted from the particles by detection apparatus which produces output signals in response to said gamma rays; and producing from the output signals a representation of the fluid flow.

In this manner, the clarity of the resulting representation is improved by virtue of the fact that at least a portion of the resulting gamma rays are accurately indicative of the position of the particle. This portion can be enhanced by using particles which comprise or substantially consist of a metal or other solid of high density. Possible high density metals include copper, tungsten or lead.

A further problem with the method of GB 2087685 referred to above arises if one wishes to study a recirculatory flow system, such as a gas turbine engine oil system. Unless one uses a radioactive isotope with a very short half-life (thereby limiting the number of available isotopes which can be used), radioactive label atoms can travel right around the system and confuse the flow representation which is produced. Furthermore, they can increase the general level of radioactivity in the system, and degrade the signal to noise ratio of the representation. Another problem with a non-recirculatory system in which the radioactive labelled fluid is ejected to the atmosphere is that of environmental pollution. However, with solid particles, both these problems can be overcome easily by filtering out the radioactive solid particles after they have passed through the area where the flow is of interest.

BRIEF DESCRIPTION OF THE DRAWINGS

An example of the invention will now be described, referring to the accompanying drawings, in which.

DESCRIPTION OF PREFERRED EMBODIMENTS

Figure 1:
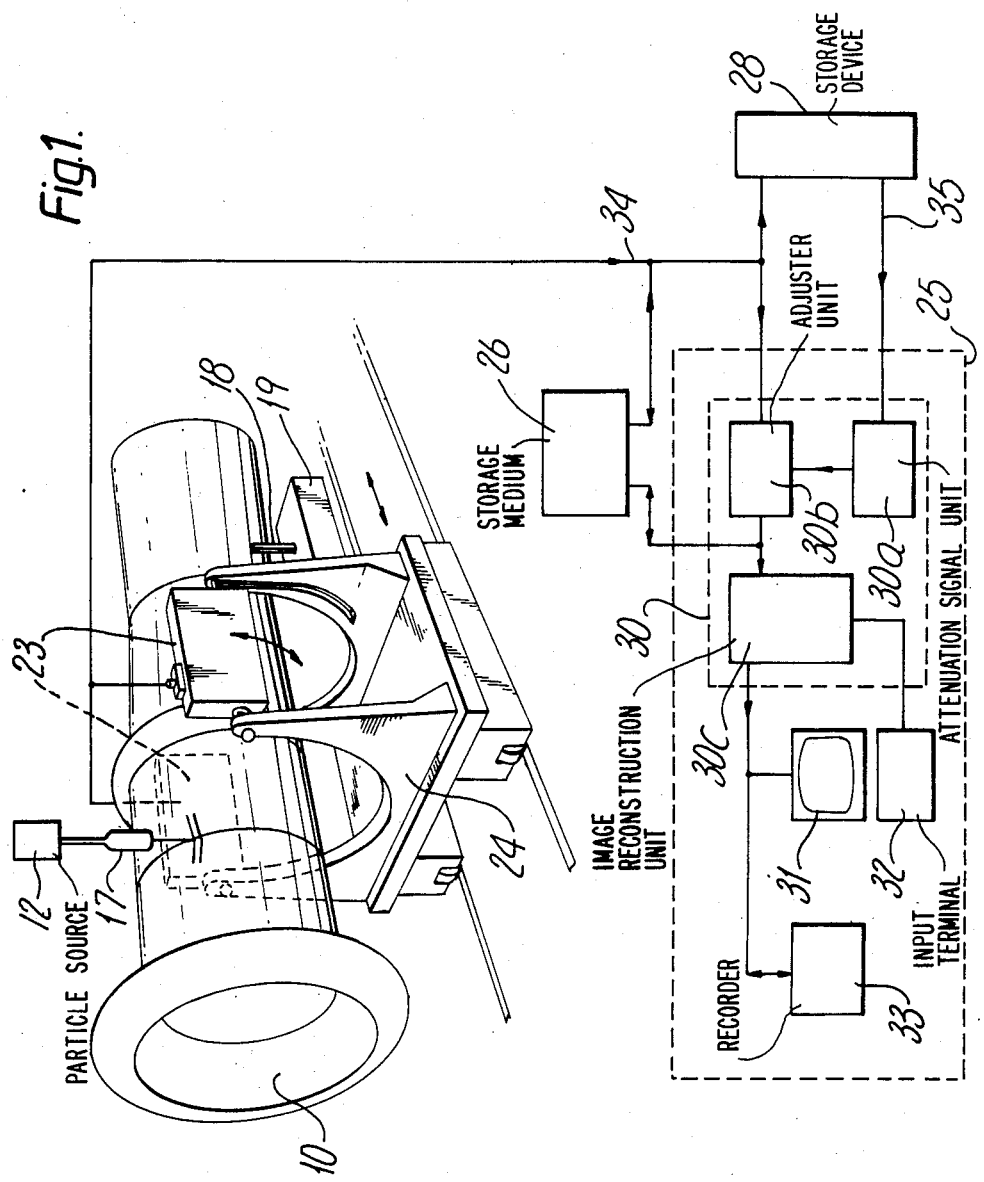
FIG. 1 illustrates diagrammatically the layout of apparatus used in analyzing fluid flows within a gas turbine engine.

Referring to the drawings, there is shown apparatus similar to that shown in specification No. GB 2087685, and reference should be made to that specification for a fuller description. That specification and the corresponding U.S. application Ser. No. 318,939 are incorporated herein by reference. Briefly, there is shown a gas turbine engine 10 of which part of the oil system is being analyzed. The apparatus includes a source 12 of labelled solid particles, which are discussed below. These are injected into the oil flow at a precise location by an injector 17. After passing through the engine, the labelled engine oil is collected via a drain line 18 in a sump 19. It then recirculates in the normal manner. The oil system includes an oil feed pump and scavenge pumps, as is normal, although these are not shown.

Two or more multi-wire proportional counters 23 are mounted in one or more opposing pairs on a carriage 24 which straddles the engine, and which is movable axially along the engine. The counters are movable relative to the carriage to pivot about the engine and movable with the carriage along the engine so that the counters can be positioned in the best position to receive the radiation produced by the radiactive decay of the isotope taking place during the test.

The signals produced by the counters may be passed directly to a signal processing system 25 to produce a real-time display of the oil flow, or, as is preferred, may be recorded and stored in a storage medium 26 such as a magnetic tape or disc for subsequent processing. It will be realized that data from many positron-decay events from different parts of the flow are required to build up a display.

As a further source of input to the signal processing system 25, a storage device 28 is provided in which is stored a representation of the spatial distribution of the structure of the engine and of the materials from which it is made. This is used as described in GB No. 2087685 to derive attenuation signals which are used to adjust the output signals from the detection apparatus, and the apparatus 25 then produces from the adjusted output signals a spatial representation of the fluid (oil) flow within the engine 10.

The particles injected from the source 12 comprise a suitable carrier, doped with a positron-emitting isotope label. A wide variety of possible isotopes can be used, the selection of a suitable one being dependent on factors such as half-life, activity, and compatibility with the system under study. A discussion will be found in GB No. 2087685.

Another factor is the method of doping the isotope into the carrier particles.

Figure 3:
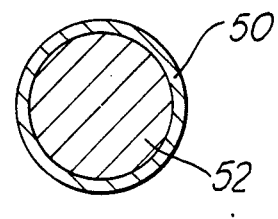
FIG. 3 is a diagrammatic cross section of a carrier particle.

One suitable method involving chemical bonding is to dope the chosen isotope label using known techniques into an ion exchange resin material, which is then used to form a coating 50 on the surface of a metal bead 52 for which the resin has a chemical affinity, giving finished particles as shown in FIG. 3. While many of the positrons will be emitted from the coating directly into the surroundings, a portion will be emitted into the metal bead 52, and at least some will be brought to rest and annihilate within the bead, producing gamma rays which are detected by the detectors 23. Obviously, the more positrons that are annihilated within the particle, the clearer will be the resulting image, but useful improvements in clarity can be obtained if the portion stopped within the particles is as low as 10%. Suitable positron-emitting isotopes which will bond with the ion exchange resin include gallium-68 and rubidium-82.

Another suitable method involves the physical retention of an isotope label in a particle. Suitable particles, of, e.g., a metal oxide, are bombarded with an ion beam from a cyclotron accelerator to produce, e.g., particles doped with fluorine-18 through the reaction $^{16}O(^3He,p)^{18}F$. Fluorine-18 has a half-life of approximately 2 hours. Other suitable positron-emitting isotopes include gallium-68 and strontium-82.

The exact size, mass, density and material of the particles used must be the subject of routine trial and experimentation which is well within the capabilities of the skilled person, because these factors vary considerably, depending on the fluid flow to be studied. The particles used should be of a size not likely to damage the engine or other equipment under study and with such a combination of surface area, surface roughness and buoyancy that the particles are entrained and carried around with the fluid flow rather than sinking or rising. For example, less dense particles will be required for gas flows than liquids. At the same time the particles should be big enough not to suffer unacceptable diffusion or mixing. Most importantly, the particles must be such as to bring acceptable proportions of the emitted positrons to rest before they escape from the particle, and the routine trial and experimentation to determine the size, mass, density and material must ensure this.

One problem which is found in practice with the fluid isotope carriers of GB No. 2087685 is that the carrier fluid (and, therefore, the label isotope) diffuses in, and mixes generally with, the fluid under study. This means that the isotope deviates from the flow path to the extent that excessive mixing occurs, and the result is a further lack of clarity in the flow representation which is produced. By suitable choice of carrier particles, this problem can be alleviated. Since the particles must also be resistant to conditions of a gas turbine engine; they will normally need to be resistant to melting, dissolution, mechanical destruction, chemical reaction, and so on. Metal oxide particles, e.g., of zirconium oxide or gallium oxide, are often more resistant to conditions such as heat which will be experienced if studying gas flow through a turbine. Metal particles, e.g., of copper, tungsten or lead, are also favored under some conditions. A suitable size for metal particles used in studying an engine oil system might be as small as 20μ diameter, though particles smaller than this are unlikely to bring to rest an adequate proportion of the positrons emitted.

Larger sizes will often be more suitable, however. The particles may have diameters up to several mm in some circumstances, but normally solid particles with diameters in the range of 100μ to 1 mm will be adequate.

Figure 2:
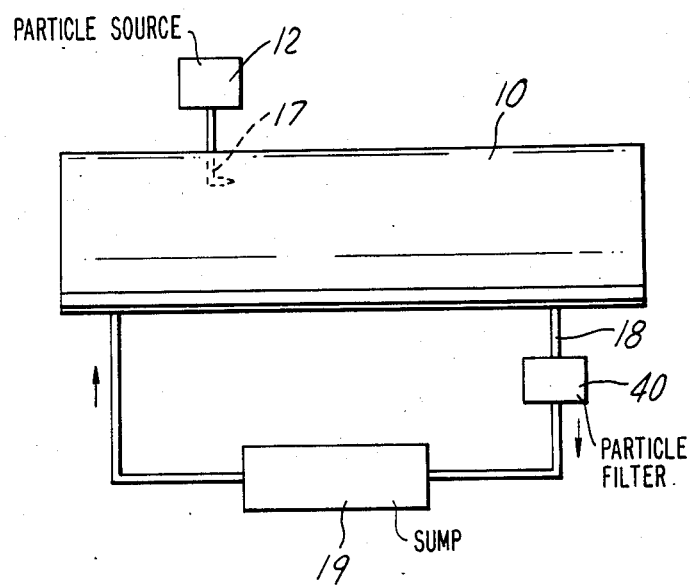
FIG. 2 illustrates diagrammatically a recirculatory oil system of such an engine.

FIG. 2 shows diagrammatically at 40 the position of a filter in the drain line 18, which is used to remove the solid radioactive particles from the fluid flow. They can then be disposed of safely, and do not recirculate to cause the problems discussed above.

We claim:

1. A method of producing a representation of a fluid flow, comprising:
   injecting into the fluid a quantity of particles capable of following the flow, the particles being labelled with a positron-emitting isotope, each particle being capable of bringing at least approximately ten percent of the positrons emitted within said particle to rest before they escape therefrom, whereby gamma rays are emitted from the particles;
   detecting said gamma rays emitted from the particles, by detection apparatus which produces output signals in response to said gamma rays; and
   producing from the output signals a representation of the fluid flow.

2. A method according to claim 1 in which the particles comprise a metal material.

3. A method according to claim 2 in which the metal is selected from the group consisting of copper, tungsten and lead.

4. A method according to claim 1 in which the particles comprise a metal oxide material.

5. A method according to claim 4 in which the metal oxide is selected from the group consisting of zirconium oxide and gallium oxide.

6. A method according to claim 1 in which the particles comprise a bead coated with a material containing the positron-emitting isotope.

7. A method according to claim 1 in which the particles have a diameter greater than 20μ.

8. A method according to claim 1 in which the particles have diameters in the range from about 100μ to about 1 mm.

9. A method of producing a representation of a fluid flow within a body, comprising:
   injecting into the fluid a quantity of particles capable of following the flow, the particles being labelled with a positron-emitting isotope, each particle being capable of bringing at least approximately ten percent of the positrons emitted within said particle to rest before they escape therefrom, whereby gamma rays are emitted from the particle;
   detecting said gamma rays emitted from the particles, by detection apparatus which produces output signals in response to said gamma rays;
   generating a representation of the spatial distribution of the structure of the body which surrounds the fluid flow and of the material from which it is made;
   producing from said representation attenuation signals representative of the attenuation of the radiation passing through the body;
   adjusting the output signals from the detection apparatus in dependence upon the attenuation signals to compensate for the attenuation of the radiation and providing adjusted output signals; and,
   producing from said adjusted output signals a representation of the fluid flow inside the body.

10. A method according to claim 1, in which a filter is provided to remove the particles from the fluid flow.

11. A method of producing a representation of a recirculating fluid flow, comprising:
   injecting into the fluid a quantity of particles capable of following the flow, the particles being labelled with a positron-emitting istope;
   detecting gamma rays emitted by annihilation of the positrons, by detection apparatus which produces output signals in response to said gamma rays;
   producing from the output signals a representation of the fluid flow; and
   filtering the particles from the fluid after they have passed through an area of interest so that such particles do not recirculate through such area, whereby confusion of and interference with the flow representation are prevented.

12. A method according to claim 11 in which each particle is capable of bringing at least approximately ten percent of the positrons emitted within said particle to rest before they escape therefrom, whereby said gamma rays are emitted from the particles.

* * * * *